(12) United States Patent
Tucci

(10) Patent No.: US 9,223,798 B2
(45) Date of Patent: Dec. 29, 2015

(54) VIRTUALIZED WORKSPACES FOR STANDARDIZATION OF ACCESS TO DATA

(75) Inventor: James Tucci, Burbank, CA (US)

(73) Assignee: Archion, Inc., Burbank, CA (US)

( * ) Notice: Subject to any disclaimer, the term of this patent is extended or adjusted under 35 U.S.C. 154(b) by 617 days.

(21) Appl. No.: 13/474,464

(22) Filed: May 17, 2012

(65) Prior Publication Data

US 2012/0296912 A1 Nov. 22, 2012

Related U.S. Application Data

(60) Provisional application No. 61/487,220, filed on May 17, 2011.

(51) Int. Cl.
*G06F 7/00* (2006.01)
*G06F 17/30* (2006.01)

(52) U.S. Cl.
CPC ................ *G06F 17/30233* (2013.01)

(58) Field of Classification Search
CPC .............. G06F 17/30569; G06F 17/30233; G06F 17/30424
USPC ........... 707/803, 999.102, 999.005, 610, 740, 707/999.101; 711/162
See application file for complete search history.

(56) References Cited

U.S. PATENT DOCUMENTS

| 6,643,642 | B1 * | 11/2003 | Habegger ................ 707/999.005 |
| 6,877,011 | B2 * | 4/2005 | Jaskiewicz ............. 707/999.102 |
| 7,702,641 | B2 * | 4/2010 | Holtz et al. ............. 707/999.101 |
| 7,702,867 | B2 * | 4/2010 | Coombs et al. ............... 711/162 |
| 7,979,475 | B2 * | 7/2011 | Mack .............................. 707/803 |
| 8,346,721 | B2 * | 1/2013 | Acedo et al. ................... 707/610 |
| 2002/0010867 | A1 | 1/2002 | Schaefer et al. |
| 2002/0156987 | A1 | 10/2002 | Gajjar et al. |
| 2005/0071596 | A1 | 3/2005 | Aschoff et al. |
| 2006/0059181 | A1 * | 3/2006 | Hutchins et al. .............. 707/101 |
| 2006/0200570 | A1 | 9/2006 | Stirbu |
| 2008/0162817 | A1 | 7/2008 | Batterywala |

FOREIGN PATENT DOCUMENTS

WO 2005055554 A1 6/2005

OTHER PUBLICATIONS

International Search Report dated Nov. 30, 2012 from Korean Intellectual Property Office.

* cited by examiner

*Primary Examiner* — James Trujillo
*Assistant Examiner* — John J Morris
(74) *Attorney, Agent, or Firm* — Rutan & Tucker LLP; John K. Fitzgerald

(57) ABSTRACT

A system and method for bridging between various operating systems, applications, file formats and file structures and the like is described. The system and methods described include the creation of a virtual workspace transparent to a user that allows the user to access information stored on an accessible computer readable medium in a manner that is compatible with the user's system, even where the requested data may reside on a system having an operating system or file structure that is incompatible with the user's system or application.

7 Claims, 2 Drawing Sheets

VIRTUALIZED WORKSPACES FOR STANDARDIZATION OF ACCESS TO DATA

CROSS-REFERENCES TO RELATED APPLICATIONS

This application claims priority from Provisional Application No. 61/487,220, filed May 17, 2011 incorporated by reference in its entirety.

BACKGROUND

1. Field of the Invention

The invention relates generally to field of data storage sharing and more particularly to sharing data storage resources between workstations, storage, operating systems and application wherein access to the data may be provided through a virtualized storage media such that access to the data is transparent to the requester, independent of the requestors application or operating system, or hardware requirements.

2. Description of Related Art

Existing software and hardware systems have many different file formats, file and folder structures, permissions, metadata and other structures that are unique to applications, operating systems and formats. In essence, it is not uncommon for a data repository to serve a number of different workstations or other users, each running on a system having a different operating system, file structure or format management or other characteristics that make sharing of data storage resources between users and systems difficult.

It is also not unusual for a network to have a number of different storage media attached to the network. It would be optimal if each of the storage media used the same file structure, formatting and permissions, so that each storage media could be accessed by any user connected to the network. Unfortunately, that is rarely the case. Instead, a network usually includes storage media that are connected to or controlled by systems that may have different operating systems and file management systems or formats. Thus a user with access to one storage media on the network may not be able to access data stored on a different storage media because of incompatibilities between the user's system and the desired storage media.

A variety of techniques have been used to address this problem, such providing an intermediate layer between the systems, the intermediate layer include translating hardware and software for allowing sharing of the media resources. However, the configuration of such a layer is time consuming and must be done manually to ensure that the particular storage media requested is registered by the layer.

What has been needed, and heretofore unavailable, is a system and method that automatically scans storage media to build a catalog of recognized file structures, formats, permissions and metadata that is then used to create a user definition. When the user requests access to a data base, the system creates a virtualized workspace that provides access to the data in a manner that is transparent to the user. The present invention satisfies these, and other needs.

SUMMARY OF THE INVENTION

In its most general aspect, the present invention provides a universal translator that provides for access to data storage resources, including computer readable media, independent of the operating system, application, or workstation hardware used by a requester of the resources or the resources themselves. In its various aspects, such a universal translator is embodied in software commands that may be used to control a processor. The processor, operating under control of the software commands, provides a virtual workspace between a requester and a storage resource. The virtual workspace appears as a mounted drive to the requestor, making the data retrieval process transparent to the requester.

In other aspects, any processor in communication with a storage resource or computer readable medium that can access the storage resource or computer readable medium may be programmed to operate in accordance with the aspects of the present invention. For example, in one aspect, a server, computer, interface board, communication board, storage appliance, Ethernet board or any other processor based device may be programmed to operate in accordance with the various aspects of the present invention. Moreover, the various aspects of the present invention are readily extensible to other devices and environments, such as cell phones, personal data assistants, tablets and the like.

In another aspect, the present invention includes a method of providing for access to a virtual storage media, comprising: receiving a request from a user system for access to data stored on a computer readable medium associated with a network; retrieving user information related to the user from user information stored in a user catalog; retrieving file structure information from file structure information stored in a file structure catalog, the file structure information related to the data being requested by the user; retrieving the requested data from data stored in an encoded database; and creating a virtual storage drive accessible by the user, the virtual storage drive containing the data requested by the user, the requested data formatted in a manner compatible with the user's system.

In yet another aspect, the information from the file structure catalog was created by scanning the computer readable medium associated with the network to determine if the file structure of the computer readable medium is contained in the file structure catalog, and if not, then creating an entry for the computer readable medium in the file structure catalog.

In still another aspect, storing data in the encoded database includes scanning the computer readable medium, encoding the data and file structure associated with a file and storing the encoded data and file structure in the encoded database.

In a further aspect, the file structure stored in the encoded database is a representation of the differences between the file structure associates with the file and a similar file structure previously encoded and stored in the encoded database, the encoded differences associated with a pointer to the similar file structure.

In a still further aspect, the present invention includes a method for efficiently storing a file structure in a data base, comprising: comparing a file structure to a catalog of existing file structures to determine which of the existing file structures is closest to the file structure; identifying differences between the determined file structure and the file structure; encoding the differences between the determined file structure and the file structure; associating the encoded differences with a pointer to the determined file structure; and storing the associated pointer and the encoded differences in a database.

In a related aspect, encoding the differences includes converting the differences to a binary representation that is capable of being unconverted to yield the differences.

In one alternative aspect, the binary representation is a unique numerical statement. In another alternative aspect, the binary representation is encoded using decimal ASCII. In still another alternative aspect, the binary representation is encoded using octal ASCII.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
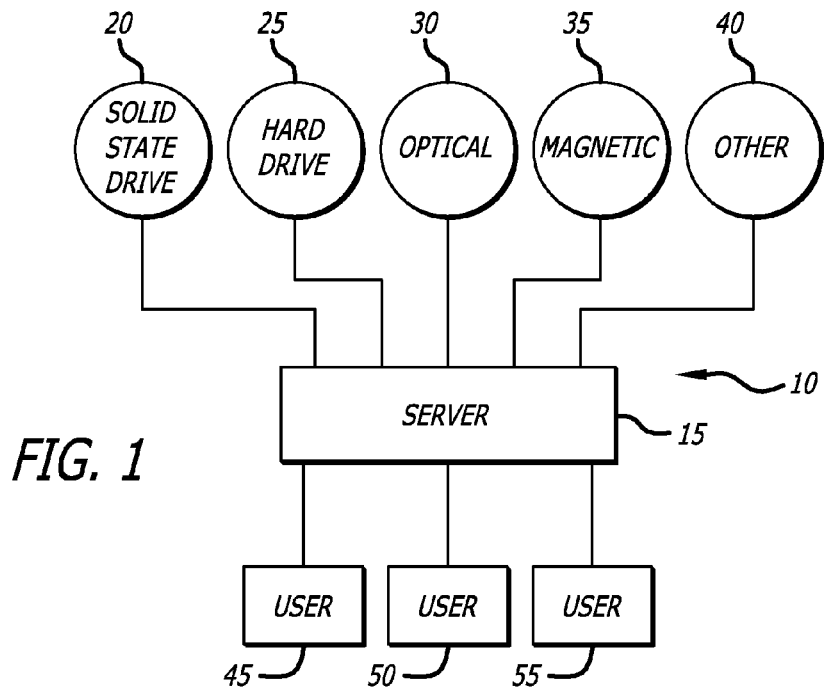
FIG. 1 is a graphical representation of a multiuser system having access to multiple storage devices upon which the embodiments of the present invention can be used.

Referring now to the drawings in detail, in which like reference numerals indicate like or corresponding elements among the several figures, there is shown in FIG. 1 a typical network system 10 having a server 15. Server 15 is in communication with a number of storage media, such as, for example, solid state drive 20, a hard drive 25, optical drive 30, magnetic media 35 or other storage media 40. Server 10 is also in communication with a number of user 45, 50, and 55.

In such a system, the system of each user may be a personal computer, tablet, mobile phone, or workstation. The users may be communicating with the server 10 over a hard wired network, or, alternatively, communication between server 10 and the users' systems may be wireless.

As apparent from FIG. 1, such a system may contain a variety of processors, operating system, applications and hardware environments. Such software and hardware systems have many different file formats, file and folder structures, permissions, metadata and other structures that are unique to the operating systems, applications or file formats. It is thus difficult to provide intelligent sharing of data resources between the various systems and applications.

As can be appreciated by those skilled in the art, multiple accesses to data resources at the same time is a requirement of current systems known as sharing. The various embodiments of the present invention provide systems and methods that bridge the file, folder, database and metadata of any one operating system, format or application to any other operation system, application or format in a manner that prevents corruptions of the metadata, data and shared resources.

Users' systems 45, 50 and 55 may employ the same, or different operating systems, so long as two-communication with server 10 may be maintained. In any case, typical user systems will include a processor that operates under the control of appropriate software commands, including software embodied in an operating system, a display function, an input function and a communication function. Each of the users' systems may also include memory of some type for storing operating system software, application software and data. Such memory may be solid state, such as read only memory (ROM) or random access memory (RAM). Alternatively, the users' systems may also include a hard drive, an optical drive, or other means for storing and accessing software commands and data.

Server 10 is configured to operate under the control of appropriate software commands well known to those skilled in the art. For example, the server may run an operating system such as MICROSOFT 2000, UNIX or the like.

From the above, it will be apparent that the present invention may be implemented by computers, servers or other processors organized in a conventional distributed processing system architecture. The various embodiments of the present invention, however, are not conventional, because they bridge multiple remote information sources, such as legacy computer application, legacy storage media and data resident on workstation storage media.

Each of the computers or servers shown in FIG. 1 may includes a main memory, such as a random access memory (RAM) or other dynamic storage device, coupled to a bus for storing information and instructions to be executed by one or more processors operating in the particular computer, server or workstation. RAM also may be used for storing temporary variables or other intermediate information during execution of instructions to be executed by the processors. The systems may also include a read only memory (ROM) or other static storage device coupled to the bus for storing static information and instructions for the processors.

The various computer system and servers shown in FIG. 1 may also include a display such as a cathode ray tube (CRT), for displaying information to a computer user. An input device, including alphanumeric and other keys, is coupled to the bus for communicating information and command selections to the processors. A mouse, trackball or cursor direction keys for communicating direction information and command selections to the processors may also be used.

According to one embodiment of the present invention, information from multiple remote resources 20, 25, 30, 35 and 40 may be retrieved by one or more users 45, 50, 55 in response to a request by a user that is communicated to server 10. This request is accomplished by the processor in the user's system executing one or more sequences of one or more instructions causing the processor to perform the necessary steps to open a communication channel to the server, and to send the server the request for access to data or information stored on one of the remote resources.

The term "computer-readable medium" as used herein refers to any media that participates in providing instructions to processor for execution, or that provides for either storing or retrieving data or other information in response to a storage command or a retrieval request. Such a medium may take many forms, including but not limited to, non-volatile media, volatile media, and transmission media. Common forms of computer-readable media include, for example, a floppy disk, a flexible disk, hard disk, magnetic tape, or any other magnetic medium, a CD-ROM, any other optical medium, a RAM, PROM, and EPROM, a FLASH-EPROM, any other memory chip or cartridge, a carrier wave as described hereinafter, or any other medium from which a computer can read.

The various computers, servers and workstations shown in FIG. 1 may also include a communication interface coupled to their respective buses. Such a communication interface provides a two-way data communication coupling to a communication link that is connected to a local or wide area network (including the Internet). For example, communication interface may be an integrated services digital network (ISDN) card, an Ethernet card or a modem to provide a data communication connection to a corresponding type of network connection. Wireless links may also be implemented. In any such implementation, communication interface sends and receives electrical, electromagnetic or optical signals that carry digital data streams representing various types of information.

As further illustrated by FIG. 1, communication links typically provide data communication through one or more networks to other data devices. For example, a communication link may provide a connection through a network link 60 between user 45 and server 10, allowing the user 45 to not only communication with server 10, but also, where appropriate permissions are in place, to access any remote resource in communication with or controlled by server 10.

Although only one server is shown in FIG. 1, those skilled in the art will recognize that system 10 may include multiple servers. Each such server may be connected to additional remote resources, and may be in communication with additional users.

While the present invention is described in relation to a network system, the principles of the invention are contemplated to be broader than applying only to systems that are resident on a server. In general, the systems and methods of the various embodiments of the present invention may be embodied in any hardware device having a processor that is in operable communication with a storage resource and that may also receive requests from users for access to that storage. For example, in one embodiment, a host bus adaptor board, an Ethernet board (or card), a RAID controller, storage appliance or the like may be configured to receive requests for access to one or more storage devices associated with the host bus adaptor board, Ethernet board, RAID controller, storage appliance or the like and, in accordance with principles of the present invention, be adapted and configured by software or hardware commands to translate the file structure and data stored on the requested storage resource into a form that is useable by the requester. It is contemplated that the present invention is readily extensible to other applications, devices or appliances, such as a cell phone, PDA (personal data assistant) or a chipset configured to carry out the processes described herein. In essence, the various embodiments of the present invention are contemplated to act as a universal translator providing a system and method of accessing any data stored on any storage resource that can be accessed by a user, regardless of whether the file structure or resource are compatible with the requestors system.

As shown in FIG. 1, the remote resources 20-40 may reside on server 10. Alternatively, all, or some of those remote resources may be associated with other servers, computers, networks or workstations. Optimally, each of the remote resources must be available to a user so that the user may store or retrieve information from the remote resource. To accomplish this, the various operating characteristics and functional parameters of each remote resource in communication with server 10 are maintained in a catalog database accessible to server 10. A problem arises, however, when a new resource is added to the system.

Example methods may be better appreciated with reference to flow diagrams. While for purposes of simplicity of explanation, the illustrated methods are shown and describes as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional blocks not illustrated.

The illustrated methods may be implements as processor executable instructions stored on computer readable media. Such instructions, when executed by a processor, computer or server, cause the processor, computer or server to perform the illustrated method or methods.

Figure 2:
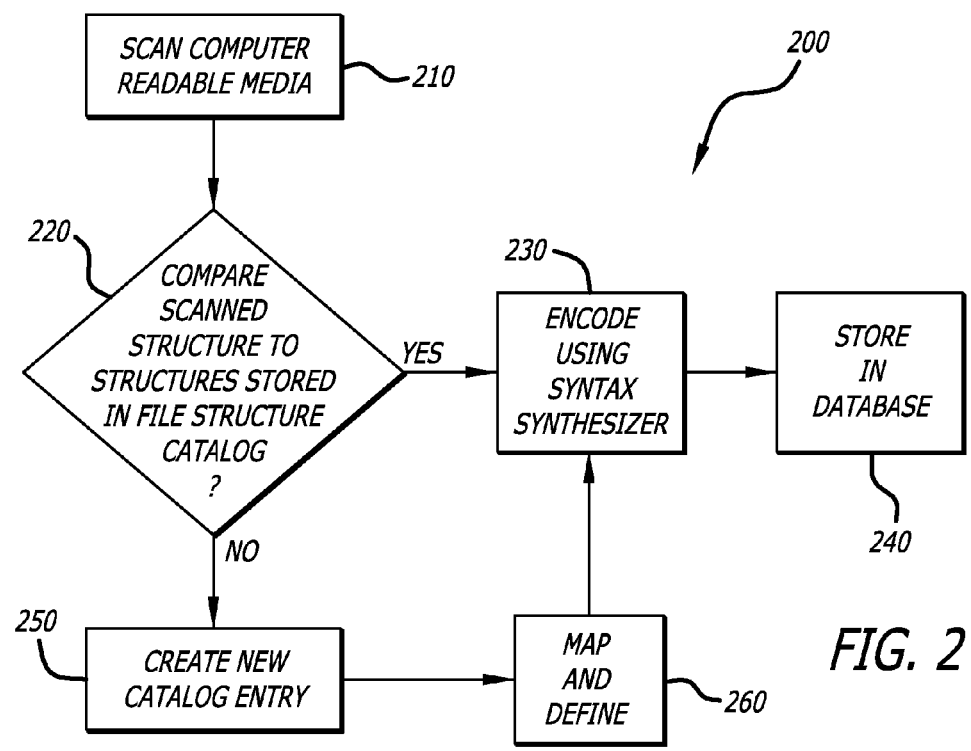
FIG. 2 is a flow diagram illustrating one method illustrating the operation of an embodiment of a database cataloging module in accordance with the present invention.

FIG. 2 illustrates an embodiment of the present invention comprising a method of for cataloging the file structures and metadata of remote resources connected to a server in a manner that provides a separate data base of file structures and metadata that allows for the translation of existing files and file structures into another file structure that is compatible with a different operating system, application or network environment without copying or moving the original files or disturbing the original file structure.

In this embodiment, a scanner program scans the file structures contained on the various storage devices accessible by the scanner in block 210. During the scan, the file structures of the various storage devices are compared to file structures already stored in a file structure catalog or database which is stored in a memory accessible by the scanning program, in block 220. If the file structure is already stored in the file structure catalog, the files on the storage media are encoded by a syntax synthesizer in block 230 and saved in a syntax synthesizer database in block 240.

The syntax synthesizer codifies the file metadata from the scanned storage device in a single database. This database automatically allows the file structure to be reproduced or rearranged to fit a user's request without altering the original file structure, and directs the access to the files to a new compatible file structure or a new expanded file structure that is compatible with the user's system. Using information obtained from the file structure catalog database, the syntax sequencer creates an encoded database structure that contains pointers to the original file position as well as the primary metadata in a universal database code.

If the comparison in block 220 of the scanned file structure to the file structure catalog database indicates that the file structure is a new file structure not previously stored in the file structure database, then a new catalog entry will be created in the file structure catalog database. The structure is then mapped and defined in block 260, and then sent to the syntax synthesizer in block 230 for encoding. The encoded file is then saved in the syntax synthesizer database in block 240.

The syntax synthesizer is configured using software commands to receive a file structure and parse the file structure in a manner that allows the file structure to be stored in manner that provides for universal access to the data stored in that file structure. To do this, the syntax sequencer applies principles in accordance with the axiom of incompleteness or a variant thereof.

During the mapping and defining step illustrated by block 260, the file structure is compared to file structures already stored in the file structure catalog database, and similarities and differences between the new file structure and existing file structures are identified. Existing file structures have been previously encoded by the syntax synthesizer. The encoding process is a method such that any file structure can be formulated into a unique code or number in such a manner that it is possible to convert back and forth between the format and the unique number. Encoding the file structure in this manner turns the file structure into a binary number or sequence of binary numbers representative of the file structure. Alternatively, only selected elements, variables or parameters of the file structure may be encoded.

Various bases may be used to generate the binary representation, such as for example, and not limited to, converting the file structure (or individual components, variables, elements, or parameters) of the file structure by encoding the file structure using decimal or octal ASCII, or Unicode. Using methods known in the art, the binary representation of the new file structure may be compared with the binary representations of existing file structures, and the similarities and differences between the file structures identified.

While there are many different types of file structures, using the method described above, the various file structures may be devolved into a few general types of file structures. The general file structures are encoded and stored by the syntax synthesizer. As new file structures are analyzed, the differences between the new structure and the existing structure or structures already encoded are identified, and those differences may be encoded and stored. The syntax synthesizer thus provides a template for translating between a generalized encoded file structure, and the encoded exceptions to that file structure, in a manner that allows translation of data stored in a particular file structure into a different file structure that is compatible with the requester's system.

For example, assume that there are five general types of file structures, and many variations of the general file structure type. Each incoming file structure is analyzed to determine which of the five general file structure type the incoming file structure most closely resembles. The differences between the identified existing file structure and the incoming file structure are then identified, encoded and stored. Thus the new structure may be stored in an efficient manner in which only the differences are encoded, with a pointer to the general structure and differences being associated and stored. When a request for the file structure is received, the incoming file structure is reconstructed by pointing to the general structure, and modifying the general structure in accordance with the encoded differences or exception.

Figure 3:
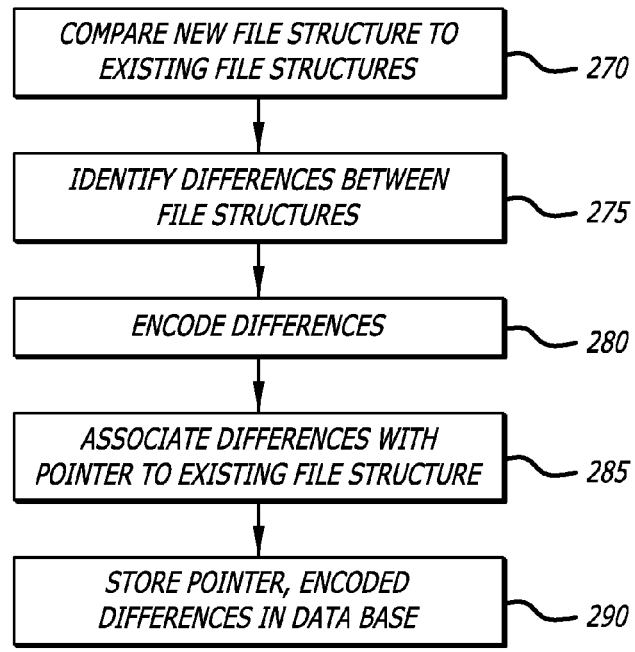
FIG. 3 is a flow diagram illustrating one method illustrating the operation of an embodiment of a syntax synthesizer in accordance with the present invention.

FIG. 3 illustrates one method used by the syntax synthesizer for analyzing and store a new data or file structure. In block 270, the new file structure is compared to existing file structures in the file structure catalog. Differences between the new file structure and the existing file structure or structures in the catalog are identified in block 275.

The identified differences between the file structures are encoded in block 280. As discussed above, one method of encoding the differences may include converting differences into a binary number in a manner that allows the binary number to be converted back to the identified difference. One such method may be to apply the axiom of incompleteness to encode the difference as a unique number. Other methods may also be used, such as using similar number ordering systems, or other methods which provide for a translatable, yet efficiently stored, representation of the identified difference.

The encoded difference is associated with a pointer to the existing file structure that will form the basis for reconstructing the file structure upon request in block 285. The associated pointer and encoded difference is then stored in a database associated with the syntax synthesizer and file structure catalog in block 290.

Figure 4:
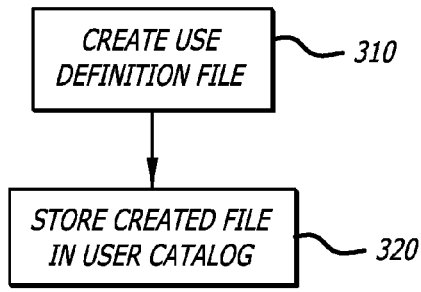
FIG. 4 is a flow diagram illustrating one method illustrating the operation of an embodiment of a user mod module in accordance with the present invention.

FIG. 4 illustrates one method for creating a user definition file in accordance with the principles of the present invention. A user definition file includes permissions and file structures that define the user's profile. A user catalog is maintained that includes user definition files for each user. A user module, which is a program run by the processor of a system in accordance with specific operating commands, provides for the creation, modification and deletion of user definition files that reside in a user catalog. For example, a user definition file is created in block 310. This file will include all pertinent information to define the type and level of access to the various storage media resources available to the user. For example, the user definition will include any permissions set by the operators of the system, such as "Operator", "Administrator" or other levels of permissions commonly known in the art. The user definition may also include an information specific to the user or user's system that are needed to ensure that data residing on a storage resource can be accessed by the user. Once the file is created in block 310, the user definition file is stored in the user catalog database in block 320.

Figure 5:
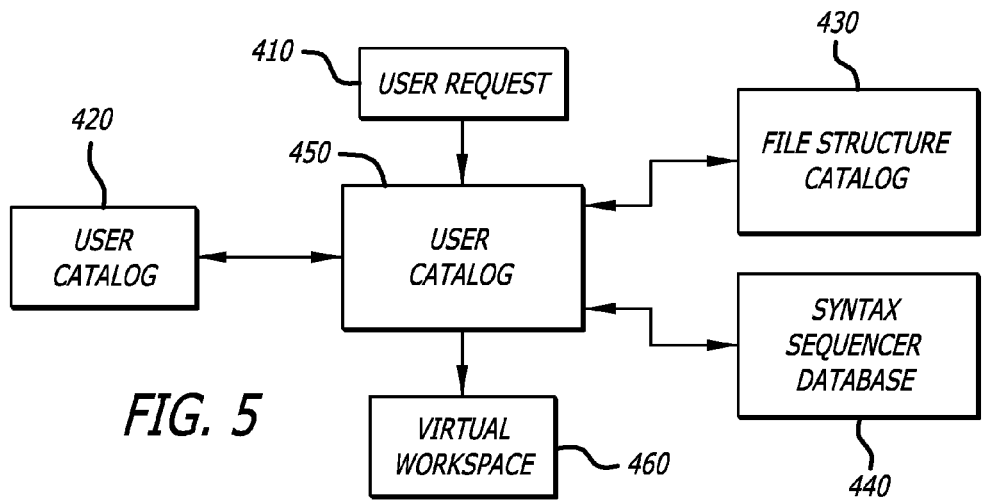
FIG. 5 is a flow diagram illustrating one method illustrating the operation of an embodiment of a user request module in accordance with the present invention.

FIG. 5 illustrates a flow diagram showing the steps carried out by one embodiment of the present invention when a user makes a request for data stored on one of the storage resources of the system. When a request is made by a user to access a particular storage resource in block 410, a processor receives the request in block 450. The processor analyzes the request, and requests information from the user catalog database in block 420. Information about the file structure is retrieved from the file structure catalog in block 430. Finally, the processor requests the file encoded data file from the syntax synthesizer database in block 440.

Once the processor has the information from the user catalog, the file structure catalog and the syntax synthesizer, a virtual workspace is created in block 460. This virtual workspace will appear to the user as a mounted file system with the correct file structure, permissions and folder structure for the application defined in the syntax synthesizer database. The requested file structure will be reconstructed from the encoded file structures contained in the syntax synthesizer database, including any modifications to an existing file structure defined by the encoded differences as discussed above that are necessary to allow access to the file requested by the user.

One advantage of the system described herein is that it allows for the translation of existing files and file structures into a file structure that is compatible with different operating systems, applications, or network environments. The various embodiments of the present invention accomplish without copying or moving the original files or disturbing the original file structures.

Moreover, the embodiments of the present invention provide a virtual workplace in accordance with the present invention in an automatic, dynamic manner. Such a virtual workplace is transparent to the user.

While several particular forms of the invention have been illustrated and described, it will be apparent that various modifications can be made without departing from the spirit and scope of the invention.

I claim:

1. A method of providing for access to a virtual storage media, comprising:
   receiving a request from a user system for access to data stored on a computer readable medium associated with a network;
   retrieving user information related to the user from user information stored in a user catalog;
   retrieving file structure information from file structure information stored in a file structure catalog, the file structure information related to the data being requested by the user;
   retrieving the requested data from data stored in an encoded database; and
   creating a virtual storage drive accessible by the user, the virtual storage drive containing the data requested by the user, the requested data formatted in a manner compatible with the user's system;
   wherein storing data in the encoded database includes scanning the computer readable medium, encoding the data and file structure associated with a file and storing the encoded data and file structure in the encoded database; and wherein the file structure stored in the encoded database is a representation of the differences between the file structure associates with the file and a similar file structure previously encoded and stored in the encoded database, the encoded differences associated with a pointer to the similar file structure.

2. A method for efficiently storing a file structure in a database, comprising:

comparing a file structure to a catalog of existing file structures to determine which of the existing file structures is closest to the file structure;

identifying differences between the determined file structure and the file structure;

encoding the differences between the determined file structure and the file structure;

associating the encoded differences with a pointer to the determined file structure; and storing the associated pointer and the encoded differences in a database.

3. The method of claim 2, wherein encoding the differences includes converting the differences to a binary representation that is capable of being unconverted to yield the differences.

4. The method of claim 3, wherein the binary representation is a unique numerical statement.

5. The method of claim 2, wherein the binary representation is encoded using decimal ASCII.

6. The method of claim 2, wherein the binary representation is encoded using octal ASCII.

7. The method of claim 1, wherein the information from the file structure catalog was created by scanning the computer readable medium associated with the network to determine if the file structure of the computer readable medium is contained in the file structure catalog, and if not, then creating an entry for the computer readable medium in the file structure catalog.

* * * * *

UNITED STATES PATENT AND TRADEMARK OFFICE
CERTIFICATE OF CORRECTION

PATENT NO.        : 9,223,798 B2
APPLICATION NO.   : 13/474464
DATED             : December 29, 2015
INVENTOR(S)       : James A. Tucci Page 1 of 1

It is certified that error appears in the above-identified patent and that said Letters Patent is hereby corrected as shown below:

In the specification

Column 1, line 14, between "to" and "field" insert --the--.

Column 1, line 20, delete "requestors" and replace it with --requestor's--.

Column 1, line 46, between "such" and "providing" insert --as--.

Column 1, line 47, delete "include" and replace it with --including--.

Column 2, line 46, delete "associates" and replace it with --associated--.

Column 3, line 19, between "users" and "module" delete "mod" and replace it with --definition--.

Column 3, line 58, between "two-" and "communication," insert --way--.

Column 6, line 46, between "in" and "manner" insert --a--.

Column 8, line 5, between "include" and "information", delete "an" and replace it with --any--.

Column 8, line 19, delete "file encoded data file" and replace it with --encoded data--.

Signed and Sealed this
Twenty-eighth Day of June, 2016

Michelle K. Lee
*Director of the United States Patent and Trademark Office*